(12) United States Patent
Backman et al.

(10) Patent No.: US 8,644,160 B2
(45) Date of Patent: Feb. 4, 2014

(54) NETWORK THROTTLE METHOD AND SYSTEM

(75) Inventors: Jan Backman, Kärna (SE); Lasse Olsson, Stenungsund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 233 days.

(21) Appl. No.: 12/984,122

(22) Filed: Jan. 4, 2011

(65) Prior Publication Data

US 2011/0317572 A1  Dec. 29, 2011

Related U.S. Application Data

(63) Continuation of application No. PCT/EP2010/070939, filed on Dec. 30, 2010.

(60) Provisional application No. 61/359,446, filed on Jun. 29, 2010.

(51) Int. Cl.
*H04L 12/26* (2006.01)

(52) U.S. Cl.
USPC ............................................ 370/236

(58) Field of Classification Search
None
See application file for complete search history.

(56) References Cited

U.S. PATENT DOCUMENTS

| | | | | |
|---|---|---|---|---|
| 8,446,826 | B2 * | 5/2013 | Csaszar et al. ................. | 370/232 |
| 2004/0121779 | A1 * | 6/2004 | Muhonen et al. .............. | 455/453 |
| 2010/0085978 | A1 * | 4/2010 | Ramankutty et al. .......... | 370/401 |
| 2010/0182907 | A1 * | 7/2010 | Pinter et al. .................... | 370/235 |
| 2010/0190497 | A1 * | 7/2010 | Pudney et al. .............. | 455/435.1 |
| 2010/0214929 | A1 * | 8/2010 | Ljung et al. .................... | 370/241 |
| 2010/0281157 | A1 * | 11/2010 | Ramankutty et al. .......... | 709/224 |
| 2010/0299419 | A1 * | 11/2010 | Ramankutty et al. .......... | 709/221 |
| 2010/0318670 | A1 * | 12/2010 | Al-Shalash et al. ........... | 709/229 |
| 2011/0176407 | A1 * | 7/2011 | Campbell ...................... | 370/216 |
| 2011/0199898 | A1 * | 8/2011 | Cho et al. ...................... | 370/230 |
| 2011/0200207 | A1 * | 8/2011 | Qiang ............................ | 370/331 |
| 2011/0217978 | A1 * | 9/2011 | Horn ............................. | 455/433 |
| 2012/0008521 | A1 * | 1/2012 | Moncaster et al. ............ | 370/252 |
| 2012/0069739 | A1 * | 3/2012 | Yabusaki et al. .............. | 370/235 |
| 2012/0110197 | A1 * | 5/2012 | Miklos et al. ................. | 709/228 |
| 2013/0182567 | A1 * | 7/2013 | Scheffenegger .............. | 370/231 |

* cited by examiner

*Primary Examiner* — Otis L Thompson, Jr.
(74) *Attorney, Agent, or Firm* — Nixon & Vanderhye P.C.

(57) ABSTRACT

A method for controlling a number of user equipments in a cellular network, the network comprises at least one user equipment (4), a first interface (1) comprising a probability algorithm capable of connecting the user equipment to a second interface (2). The second interface (2) comprises the probability algorithm and is capable of connecting the user equipment (4) to a third interface (3) comprising the probability algorithm. The user equipment (4) sends an attach request to the first interface (1), the first interface (1) sends a create session request to the second interface (2) and the second interface (2) sends an authentication request to the third interface (3). The load on the third interface (3) is indicated by a first flag set in the response from the second interface (2) to the first interface (1). The value of the first flag in the response is calculated by the probability algorithm in the second interface (2). The first flag in the response from the second interface (2) to the first interface (1) is submitted to the first interface (1) and if the first flag indicates that the load on the third interface (3) is too high, one or several actions from the group comprising, the first interface (1) disconnecting the user equipment (4), aborting the procedure, delaying the procedure, and retrying the procedure towards a different secondary interface, are carried out.

11 Claims, 3 Drawing Sheets

NETWORK THROTTLE METHOD AND SYSTEM

This application is a Continuation of International Application No. PCT/EP2010/070939 filed 30 Dec. 2010, which designated the U.S. and claims the priority benefit of U.S. Provisional Application No. 61/359,446 filed 29 Jun. 2010, the entire contents of each of which are hereby incorporated by reference.

The present invention relates to a method and a system for controlling a number of user equipments in a cellular network. The network comprises at least one user equipment, a first interface comprising a probability algorithm capable of connecting the user equipment to a second interface, the second interface comprising the probability algorithm and being capable of connecting the user equipment to a third interface comprising the probability algorithm. Further, the user equipment sends an attach request to the first interface, the first interface sends a create session request to the second interface and the second interface sends an authentication request to the third interface.

BACKGROUND

Functions to throttle/load share activation attempts are needed in the core network. The ideas that exist today are either based on DNS (Domain Name System) solutions or that the GGSN/gateways (Gateway GPRS (General Packet Radio Service) Support Node) tell their "weight" value. This does not make them adaptive enough or granular enough when it comes to APN (Access Point Name) based decisions.

There are some additional issues with existing solutions. For instance, when it comes to the DNS based idea it cannot be implemented so that it is adaptive enough. Further, when it comes to the idea about weight values the APN granularity is lost. Furthermore, dynamic behaviour in a distributed system may also be hard to handle. Thus, none of the existing solutions fulfils the needs operators have in today's networks.

SUMMARY

The object of the present invention is to provide a method that alleviates some of the above mentioned problems.

This object is achieved by the method and apparatus set forth in the appended claims.

According to the present invention, there is a method for controlling a number of user equipments in a cellular network. The network comprises at least one user equipment, a first interface comprising a probability algorithm capable of connecting the user equipment to a second interface. The second interface comprises the probability algorithm and is capable of connecting the user equipment to a third interface comprising the probability algorithm. The user equipment sends an attach request to the first interface. The first interface sends a create session request to the second interface. The second interface sends an authentication request to the third interface. The load on the third interface is indicated by a first flag set in the response from the second interface to the first interface. The value of the first flag in the response is calculated by the probability algorithm in the second interface. The first flag in the response from the second interface to the first interface is submitted to the first interface. Further, if the first flag indicates that the load on the third interface is too high, one or several actions from the group comprising, the first interface disconnecting the user equipment, aborting the procedure, delaying the procedure, and retrying the procedure towards a different secondary interface, are carried out.

The idea is that the GGSN, SGW (Serving GateWay), PGW (Packet GateWay) sets a flag in the response messages towards the SGSN/MME (Serving GPRS Support Node/Mobility Management Entity). In the flag sent there should also be a field that represent APN to indicate the external network behaviour from the GGSN/PGW that often can be on APN level.

The flags shall be used as an early congestion indication to allow the SGSN/MME to have different behaviour depending on where in the network congestion appears. Such a congestion notification may for instance not be sent when the node/APN is loaded below 70% (PDP (Packet Data Protocol) contexts, signalling capacity or queue-sizes are different aspects of measuring load), but increasingly often be sent based on load or failure ratio on signalling to other nodes and typically be sent for every message when the node/APN can not receive any more sessions.

To make these decisions the MME/SGSN should have a framework making it possible to calculate statistics of the frequency of the appearance of these flags. This allows the MME/SGSN to determine how loaded the SGW, PGW/GGSN and external servers related to APN level are.

Failures (time-outs, rejections) in GTP (GPRS Tunnelling Protocol) signalling towards a node that are not supporting these flags can also be used to allow backward compatibility with nodes that are not supporting this feature. One way of doing this is to make the MME/SGSN decrease the creation rate towards servers that have high frequency of failures of some kind. Failing requests do most often generate a load in the receiving system and decreasing the signalling rate helps the system to recover from the too high load. By introducing the early notifications the overload situation can even be avoided and not only more efficiently recovered from.

Policies for how to handle high load can for instance be to make a decision to continue the procedure, abort the procedure OR continue with next Gateway in the resolved APN list. This will in fact create an adaptive GGSN blacklisting/load sharing function that also handles overloaded APNs over a range of GGSNs/Gateways.

Thus, the method of the present invention will provide simple and effective configuration, it helps to throttle APN activation attempts, it helps to load share gateways, and it adaptively blacklists gateways only when needed, or only decreases the rate for new creations. Further, some mobile operators request this kind of function. Also, some aspects of the idea can also be applied for nodes not supporting the extension to the signalling.

In a preferred embodiment of the invention the load on the second interface is indicated by a second flag set in the response from the first interface to the user equipment, the value of the second flag in the response being calculated by the probability algorithm in the first interface and if the second flag indicates that the load on the second interface is too high, one or several actions from the group of the first interface disconnecting the user equipment, aborting the procedure, delaying the procedure and retrying the procedure towards a different secondary interface, are carried out.

According to another embodiment a fourth interface comprising a probability algorithm is present between the second interface and the third interface and the load on the third interface is indicated by a third flag set in the response from the fourth interface to the second interface, the value of the third flag in the response being calculated by the probability algorithm in the second interface. Also, the third flag in the response from the second interface to the first interface is submitted to the first interface and if the first flag indicates that the load on the third interface is too high, one or several actions from the group of the first interface disconnecting the user equipment, aborting the procedure, delaying the procedure and retrying the procedure towards a different secondary interface, are carried out.

According to one aspect of the invention, if the load on the first interface is too high, one or several actions from the group of the first interface disconnecting the user equipment, aborting the procedure, delaying the procedure and retrying the procedure towards a different secondary interface, are carried out.

According to a further aspect of the invention the user equipment is allowed to resend an attach request to the first interface based on that a time greater than a preset time value in the probability algorithm has elapsed.

In yet another embodiment of the invention a predetermined number of flags are needed before the user equipment is allowed to resend an attach request to the first interface.

According to a further aspect of the invention the first interface is a SGSN interface, the second interface is a GGSN interface and the third interface is a radius server interface.

According to another aspect of the invention the first interface is a MME interface, the second interface is a SGW interface, the third interface is a radius server interface and the fourth interface is a PGW interface.

According to yet another aspect of the invention the second interface after receiving indication of that the load on the third interface is too high attempts to send an authorization request to a different interface of the same type as the third interface.

In one embodiment a PDP context request is activated and created. This aspect enables for 2G and 3G.

DETAILED DESCRIPTION

Figures 1, 2:
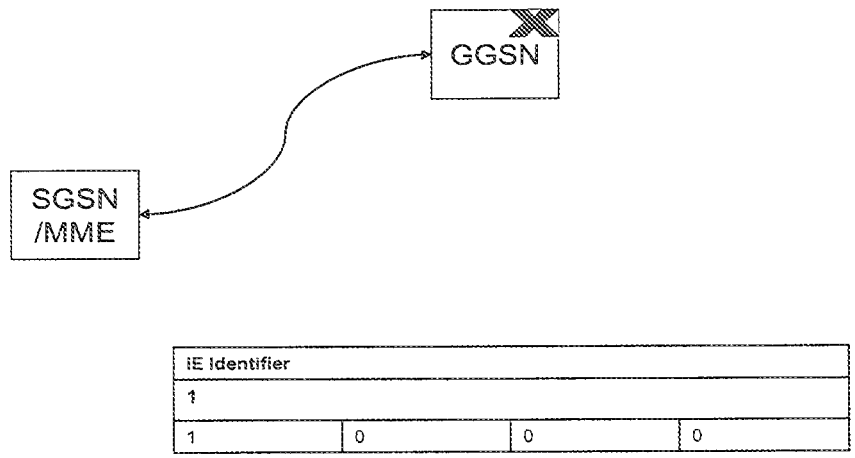
FIG. 1 shows an example of a FLAG IE.
FIGS. 2-5 shows the flags set for various situations.

The Gateways shall include either a FLAG IE or private extension looking something like the example illustration in FIG. 1.

The Flag IE shall be included in Create PDP Context Response and Create Session Response messages in the manner shown in FIGS. 2-5.

FIG. 2 displays the status if PDP is rejected by internal GGSN reasons.

Figure 3:
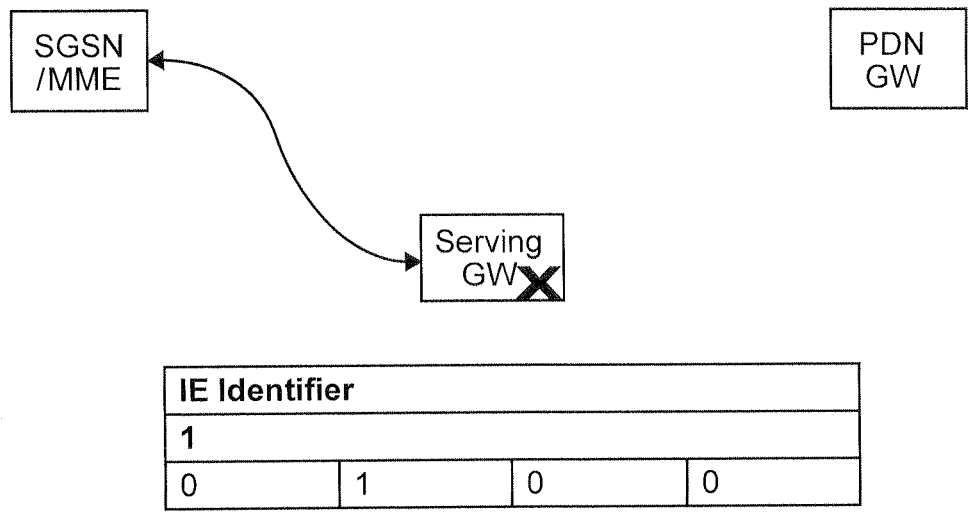

FIG. 3 displays the status if a Bearer is rejected by Serving Gateway for internal reasons.

Figure 4:
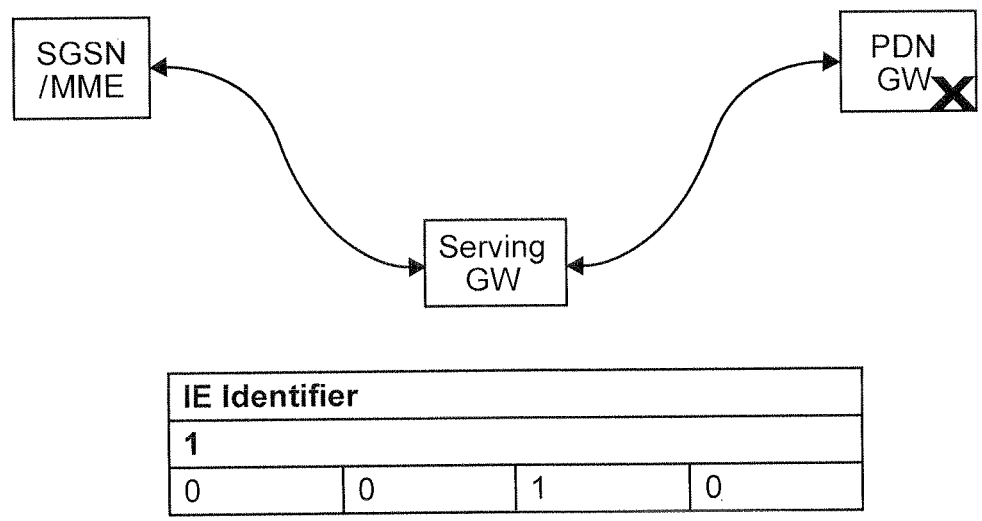

FIG. 4 displays the status if Bearer is rejected by PDN Gateway for internal reasons.

Figure 5:
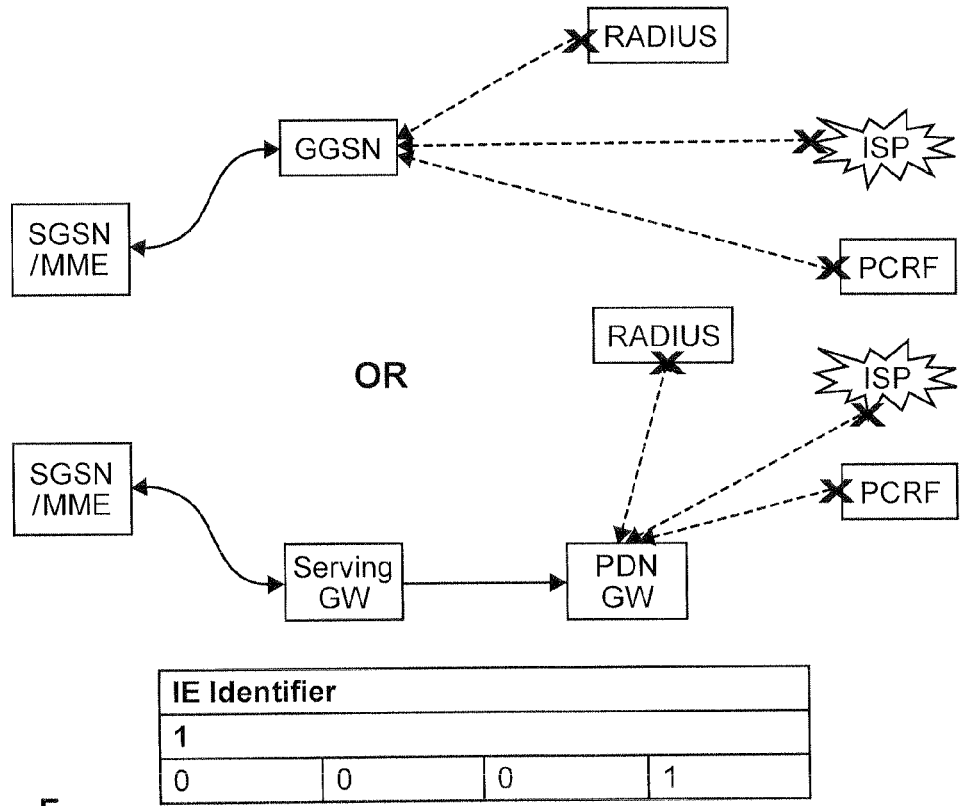
Figure 6:
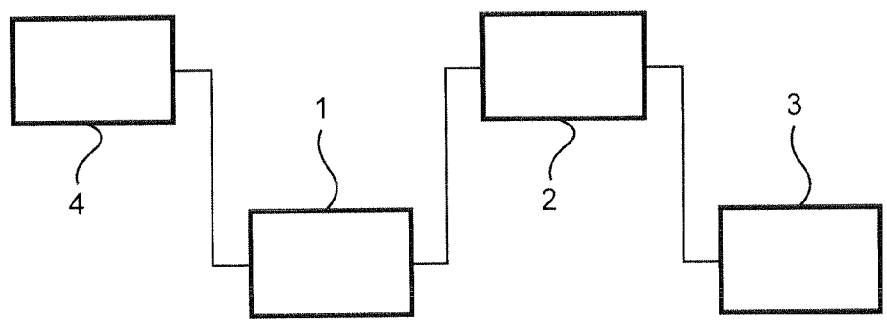
FIG. 6 illustrates a method and connections of the various parts of the system.

FIG. 5 illustrates the status if PDP/Bearer is rejected due to other issues connected to that APN. For example, the rejection can originate from a radius server interface, RADIUS, or a Policy charging and rules function, PCRF. The RADIUS is an acronym for "Remote Authentication Dial In User Service" and is a networking protocol that provides centralized Authentication, Authorization, and Accounting, AAA, management for computers to connect and use a network service. RADIUS was developed by Livingston Enterprises, Inc., in 1991 as an access server authentication and accounting protocol and later brought into the Internet Engineering Task Force, IETF, standards The PCRF is a node designated in real-time to determine policy rules in a multimedia network FIG. 6 displays a method for a network comprising at least one user equipment 4, a first interface 2 comprising a probability algorithm capable of connecting the user equipment 4 to a second interface 2. The second interface 2 comprises the probability algorithm and is capable of connecting the user equipment 4 to a third interface 3 comprising the probability algorithm. The user equipment 4 sends an attach request to the first interface 1. The first interface 1 sends a create session request to the second interface 2. The second interface 2 sends an authentication request to the third interface 3.

The load on the third interface 3 is indicated by a first flag set in the response from the second interface 2 to the first interface 1. The value of the first flag in the response is calculated by the probability algorithm in the second interface 2. The first flag in the response from the second interface 2 to the first interface 1 is submitted to the first interface 1. Further, if the first flag indicates that the load on the third interface 3 is too high, one or several actions from the group comprising, the first interface 1 disconnecting the user equipment 4, aborting the procedure, delaying the procedure, and retrying the procedure towards a different secondary interface, are carried out.

The SGSN-MME may have the following operator configurable framework:
Parameter 1) Counter, number of failed attempts, flags (within parameter 2) is needed to trigger action.
Parameter 2) Timer, duration (time length) should be measured, triggered by first received flag.
Parameter 3) Timer, effective length of the action.
Parameter 4) Action, try towards next gateway/GGSN or abort procedure and trust re-transmissions.

| Reporter | Occurrences | Occurrence Timer | Action Timer | Action |
|---|---|---|---|---|
| GGSN | 3 | 5 | 30 | Continue with next (GGSN) |
| Serving Gateway | 2 | 2 | 10 | Continue with next (SGW) |
| PDN Gateway | 4 | 10 | 20 | Continue with next (PGW) |
| APN | 5 | 3 | 45 | Abort Activation |

The table above displays an example: The create session response is received with the flag set in the SGW field. The "Occurrences" field shall be stepped with 1 and the "Occurrence Timer" shall be started. Another create session response is received with the flag set in the SGW within 2 sec.

Action is in effect, "Action timer", 20 sec, is started.
A new create session request is sent but towards a different Serving Gateway.
During this period no new attempts are initiated towards that Serving Gateway.
After 20 sec everything is back to normal.
The foregoing is a non-limiting example. However, it is apparent that the technology described may incorporate modifications and variations. Inasmuch as the foregoing disclosure is intended to enable one skilled in the art to practice the instant invention, the invention should not be construed to be limited the disclosure, but should be construed to include such modifications and variations as fall within the scope of the claims.

The invention claimed is:
1. A method for controlling a number of user equipments (UEs) in a cellular network, the network comprising at least one user equipment, a first interface including a congestion probability algorithm that connects the user equipment to a second interface as part of a UE activation procedure, the second interface including the congestion probability algorithm and that connects the user equipment to a third interface also including the congestion probability algorithm, the method comprising:

the user equipment sending an attach request to the first interface;

the first interface sending a create session request to the second interface;

the second interface sending an authentication request to the third interface wherein:

the load on the third interface is indicated by a first flag set in the response from the second interface to the first interface, the value of the first flag in the response being either set to an on value or reset to an off value, and the congestion probability algorithm in the second interface sets the first flag value to the on value if a current load on the third interface exceeds a predetermined threshold;

the first flag in the response from the second interface to the first interface is submitted to the first interface;

detecting a frequency of first flags set to the on value; and determining that the detected frequency of first flags set to the on value indicates that the load on the third interface is increasing, and in response thereto, performing one or several actions from the group including the first interface disconnecting the user equipment, aborting the UE activation procedure, delaying the UE activation procedure, and retrying the UE activation procedure towards a different secondary interface.

2. A method according to claim 1, wherein:

the load on the second interface is indicated by a second flag set in the response from the first interface to the user equipment, the value of the second flag in the response being either set to an on value or reset to an off value, and the congestion probability algorithm in the first interface sets the second flag value to the on value if a current load on the second interface exceeds a predetermined threshold;

detecting a frequency of second flags set to the on value;

determining the detected frequency of second flags set to the on value indicates that the load on the second interface is increasing, and in response thereto, performing one or several actions from the group including the first interface disconnecting the user equipment, aborting the UE activation procedure, delaying the UE activation procedure, and retrying the UE activation procedure towards a different secondary interface.

3. A method according to claim 1, wherein:

a fourth interface including the congestion probability algorithm is present between the second interface and the third interface, and the load on the third interface is indicated by a third flag set in the response from the fourth interface to the second interface, the value of the third flag in the response being calculated by the congestion probability algorithm in the second interface;

the third flag in the response from the second interface to the first interface is submitted to the first interface.

4. A method according to claim 1, wherein if the load on the first interface is too high, performing one or several actions from the group including the first interface disconnecting the user equipment, aborting the procedure, delaying the UE activation procedure, and retrying the UE activation procedure towards a different secondary interface.

5. A method according to claim 1, wherein the user equipment is allowed to resend an attach request to the first interface if a time greater than a preset time value in the congestion probability algorithm has elapsed.

6. A method according to claim 1, wherein the first interface is a SGSN interface, the second interface is a GGSN interface and the third interface is a radius server interface.

7. A method according to claim 3, wherein the first interface is a MME interface, the second interface is a SGW interface, the third interface is a radius server interface, and the fourth interface is a PGW interface.

8. A method according to claim 1, wherein the second interface after receiving indication of that the load on the third interface is too high attempts to sends an authorization request to a different interface of the same type as the third interface.

9. A method according to claim 1, wherein a PDP context request is activated and created.

10. A method for controlling a number of use equipments (UEs) in a cellular network, the network, comprising at least one user equipment, a first interface including a congestion probability algorithm that connects the user equipment to a second interface as part of a UE activation procedure, the second interface including the congestion probability algorithm and that connects user equipment to a third interface also including the congestion probability algorithm, the method comprising:

the user equipment sending an attach request to the first interface;

the first interface sending a create session request to the second interface;

the second interface sending an authentication request to the third interface wherein:

the load on the third interface is indicated by a first flag set in the response from the second interface to the first interface, the value of the first flag in the response being calculated by the probability algorithm in the second interface;

the first flag in the response from the second interface to the first interface is submitted to the first interface; and if the first flag indicates that the load on the third interface is too high then, one or several actions from the group including the first interface disconnecting the user equipment, aborting the procedure, delaying the procedure, and retrying the procedure towards a different secondary interface, are carried out, wherein a predetermined number of flags are needed before the user equipment is allowed to resend an attach request to the first interface.

11. A system for controlling a number of user equipments (UEs) in a cellular network, the network comprising:

at least one user equipment (UE), a first node including a first interface, a second node including a second interface, a third node including a third interface, the first interface including a congestion probability algorithm for connecting the user equipment to the second interface as part of a UE activation procedure, the second interface including the congestion probability algorithm for connecting the user equipment to the third interface including the congestion probability algorithm, wherein when the system is in use:

the user equipment sends an attach request to the first interface, the first interface sends a create session request to the second interface, and the second interface sends an authentication request to the third interface, the load on the third interface is indicated by a first flag set in a response from the second interface to the first interface, a value of a first flag in the response being either set to an on value or reset to an off value, and the congestion probability algorithm in the second interface sets the first flag value to the on value if a current load on the third interface exceeds a predetermined threshold, and the first flag in the response from the second interface to the first interface is submitted to the first interface, detecting a frequency of first flags set to the on value, and determining that the detected frequency of first flags set to the on value indicates that the load on the third interface is increasing, and in response thereto, performing one or several actions from the group including the first interface disconnecting the user equipment, aborting the UE activation procedure, delaying the UE activation procedure, and retrying the UE activation procedure towards a different secondary interface.

* * * * *

UNITED STATES PATENT AND TRADEMARK OFFICE
CERTIFICATE OF CORRECTION

PATENT NO. : 8,644,160 B2  
APPLICATION NO. : 12/984122  
DATED : February 4, 2014  
INVENTOR(S) : Backman et al.

Page 1 of 1

It is certified that error appears in the above-identified patent and that said Letters Patent is hereby corrected as shown below:

On the title page, item (57), under "ABSTRACT", in Column 2, Lines 1-23, delete "A method for……..are carried out." and insert -- A cellular network comprises a user equipment (UE) and a first interface including a probability algorithm for connecting the UE to a second interface. The second interface includes the probability algorithm and connects the UE to a third interface that also includes the probability algorithm. The UE sends an attach request to the first interface, which sends a create session request to the second interface. The second interface sends an authentication request to the third interface. The load on the third interface is indicated by a first flag included in a response sent from the second interface to the first interface. The value of the first flag is calculated by the probability algorithm in the second interface. If the first flag indicates that the load on the third interface is too high, then one or more actions is performed by the first interface including: disconnecting the user equipment, aborting the procedure, delaying the procedure, and retrying the procedure towards a different secondary interface. --, therefor.

In the Claims

Column 5, Line 41, in Claim 2, delete "the detected" and insert -- that the detected --, therefor.

Column 6, Line 19, in Claim 10, delete "of use" and insert -- of user --, therefor.

Column 6, Line 20, in Claim 10, delete "network, comprising" and insert -- network comprising --, therefor.

Column 6, Line 25, in Claim 10, delete "connects user" and insert -- connects the user --, therefor.

Signed and Sealed this  
Second Day of September, 2014

Michelle K. Lee  
*Deputy Director of the United States Patent and Trademark Office*